June 23, 1970     H. DE LANG ETAL     3,517,329
LASER HAVING AN ELECTROSTRICTIVE DETUNING MEMBER
Filed Sept. 28, 1966
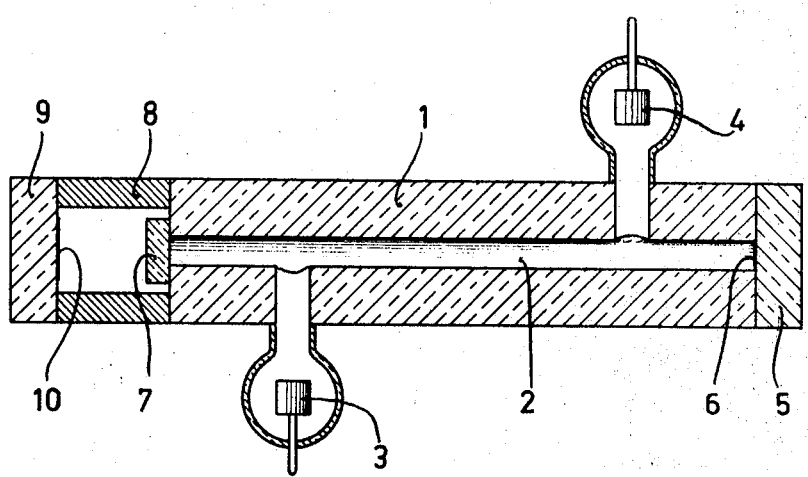
INVENTORS
HENDRIK de LANG
GIJBERTUS BOUWHUIS
BY
AGENT

United States Patent Office 3,517,329
Patented June 23, 1970

3,517,329
LASER HAVING AN ELECTROSTRICTIVE DETUNING MEMBER
Hendrik de Lang and Gijsbertus Bouwhuis, Eindhoven, Netherlands, assignors, by mesne, assignments, to U.S. Philips Corporation, New York, N.Y., a corporation of Delaware
Filed Sept. 28, 1966, Ser. No. 582,719
Claims priority, application Netherlands, Oct. 8, 1965, 6513042
Int. Cl. H01s 3/02
U.S. Cl. 331—94.5
4 Claims

ABSTRACT OF THE DISCLOSURE

A laser having an electrostrictive detuning member outside of the sealed portion of the discharge space. The member serves to space the terminating reflector from the discharge cavity. The cavity is sealed at the detuning end by means of a low energy absorption plate.

---

The invention relates to laser construction and particularly to a detuning arrangement for a gas discharge laser.

Detuning, frequency shifting, or frequency modulation of an oscillating laser may be accomplished by varying the length of the discharge cavity. In a gas discharge laser, the detuning displacement may be provided by a perforated cylindrical body of electrostrictive material inserted between the cavity discharge space and one of the two spaced reflectors. Since electrostrictive material may be made to expand by means of a voltage applied to the terminals thereof, the reflector separation and thus the cavity length may be selectively altered.

An arrangement such as is described above may be found in a pending application 486,384, filed Sept. 10, 1965 and assigned to the assignee of the present invention. In certain cases, particular care in the construction of this arrangement must be taken to neutralize or minimize any curvature of the body, resulting from electrostriction, which would cause frequency instability as well as possible leaks or contamination of the discharge space gases. In order to prevent gaseous contamination or leaks, a glass tube is secured by means of cement to the central bore of the body of electrostrictive material, thereby further complicating the construction of such a device. Further, to replace the electrostrictive material requires that the discharge space be broken into.

One solution to the foregoing difficulties may be found in U.S. application Ser. No. 582,441, filed Sept. 27, 1966, and assigned to the assignee of the present invention. There, a gas discharge laser of the type having a discharge cavity located within a block of insulating material and having reflective cavity terminators is provided with an electrostrictive detuning member including two terminal plates of quartz or glass. Each of the terminal plates contain an aperture and are interconnected by means of a glass or quartz tube having a widened, resilient central portion and sealed to each of the plates in the approximate area of the aperture. To the outside area of one terminal plate a reflector is secured with optically ground fitting surfaces, while to the outside area of the other terminal plate the discharge duct or cavity in the block of insulating material is affixed. Between the two terminal plates is connected an electrostrictive body which may take the form of a sheath enclosing the periphery of the terminal plates in two or more sections. The sheath is provided with electrodes on inner and outer sides for applying the requisite voltage. This arrangement however, while satisfactory in solving problems of curvature and access to the electrostrictive material, remains a somewhat complex structure, requiring many optically ground fitting surfaces and careful construction techniques.

It is therefore a prime object of the invention to provide a relatively simple and novel construction for electrostrictive detuning in a laser.

It is a further object of the invention to provide a laser employing electrostrictive detuning in a manner which will result in minimal effect upon the curvature and seal of the laser cavity.

It is a still further object of the invention to provide a laser construction employing electrostrictive detuning wherein the electrostrictive material may be removed without disturbing or contaminating the discharge space.

In accordance with the invention, a gas discharge laser of the type having a discharge cavity located within a block of insulating material and having reflective cavity terminators is provided with an electrostrictive detuning member in the form of or included in a hollowed body. The body is attached as part of the block or between the block and the reflective cavity terminator so as not to interfere with the optical path of the stimulated emission. In order to seal the cavity in a vacuum tight manner a planoparallel plate of a material which is relatively nonabsorbent to the wavelength range of the stimulated emission energy is attached at that end of the block having the attached body. The planoparallel plate and the cavity end reflectors are positioned such that they are mutually parallel. The cavity is sealed at the other end of the block by means of a suitable plate having the second cavity terminating reflector affixed thereto.

With this arrangement, the electrostrictive body of the detuning member no longer constitutes a boundary of the vacuum space so that the discharge space cannot be contaminated. The electrostrictive body need no longer be provided with optically ground fitting surfaces and conventional means may be used for rendering the reflector parallel to that disposed at the other end of the laser.

Since the reflector and the planoparallel plate are arranged parallel to one another and the reflector has a high reflectivity power, the total quantity of reflected light will be influenced only slightly by the planoparallel plate.

In order to further reduce the influence of any reflections due to the two surfaces of the planoparallel plate, the thickness thereof may be rendered equal to an integral multiple of half the wavelength of the laser light.

The invention will now be described more fully with reference to the drawing, which is a diagrammatic sectional view of a laser in accordance with the invention.

A quartz black 1 having a length of approximately 12 cms. is provided with a duct 2 having a diameter of approximately 4 mm. Discharge electrodes 3 and 4 are arranged within lateral widened portions of the blocks. A quartz plate 5 is fitted onto one end of the block and supports a dielectric mirror 6. A planoparallel quartz blank 7 having a thickness of 5 mms. is fitted onto the other end. An electrostrictive body 8 supports a quartz plate 9 on which a dielectric mirror 10 is arranged. The mirrors 6 and 10 and the quartz plate 7 are arranged parallel to each other. When voltages are applied to proper electrodes (not shown) on the body 8, the length of this body and hence the length of the light path between the dielectric mirrors 6 and 10 may be controlled.

The gas filling consists of He containing 10% of Ne, and with a discharge in the duct 2, a laser effect can be obtained along a wave length of 6328 A. Under the influence of the light passed by one of the reflectors a control voltage can be produced for the electrostrictive body. In order to limit this control voltage, it may be combined with a thermal detuning member (not shown) for the length of the block 2. To reduce reflection losses, the thickness of the plate 7 is made equal to an integral multiple of one half the wave length of the laser light.

The above cited embodiments are intended as exemplary only, and while we have described out invention with a specific application and embodiment thereof, other modifications will be apparent to those skilled in the art without departing from the spirit and scope of the invention.

What is claimed is:

1. In a device for producing stimulated emission with a gaseous discharge in a cavity within a block of material, said cavity optically terminated by reflectors, a detuning member mounted to said block of material and surrounding said cavity between said terminating reflectors, said detuning member comprising a body of material positioned outside the path of said stimulated emission and having the characteristic of varying dimensions by means of a voltage applied thereto, said device further including sealing means for sealing that portion of said cavity within said block of material, said sealing means having relatively low energy absorption within the wavelength range of said stimulated emission.

2. The combination of claim 1 wherein said means has a thickness substantially equal to an integral multiple of one half the wavelength of the stimulated emission.

3. In a device for producing stimulated emission with a gaseous discharge in a cavity within a block of material, said cavity optically terminated by reflectors, a detuning member for mounting one of said cavity terminating reflectors to said block of material, said detuning member comprising a body of material positioned outside the path of said stimulated emission and having the characteristic of varying dimension by means of a voltage applied thereto, said device further including a planoparallel plate sealing the cavity at that end of said block of material terminating at said detuning member, said plate having relatively low energy absorption within the wavelength range of said stimulated emission, and positioned parallel to the reflector mounted by said detuning member.

4. The combination of claim 3 wherein said plate has a thickness substantially equal to an integral multiple of one half the wavelength of the stimulated emission.

References Cited

UNITED STATES PATENTS

| | | | |
|---|---|---|---|
| 3,166,673 | 1/1965 | Vickery et al. | 331—94.5 |
| 3,170,122 | 2/1965 | Bennett | 331—94.5 |
| 3,387,226 | 6/1968 | Haisma et al. | 331—94.5 |

OTHER REFERENCES

Mielenz et al., Journal of Research of the National Bureau of Standards, vol. 68 C, Jan.–Mar. 1964, pp. 1–6.

ROY LAKE, Primary Examiner

S. H. GRIMM, Assistant Examiner

U.S. Cl. X.R.

350—160